United States Patent [19]

Kamo et al.

[11] Patent Number: 4,931,816
[45] Date of Patent: Jun. 5, 1990

[54] INTERNAL PRESSURE ADJUSTING MECHANISM FOR UNDERWATER AND WATERPROOF PRODUCTS

[75] Inventors: Makoto Kamo; Isamu Nakajima, both of Osaka, Japan

[73] Assignee: Minolta Camera Kabushiki Kaisha, Osaka, Japan

[21] Appl. No.: 358,826

[22] Filed: May 30, 1989

[30] Foreign Application Priority Data

May 30, 1988 [JP] Japan .................... 63-133719

[51] Int. Cl.⁵ .............................. G03B 17/08
[52] U.S. Cl. ....................................... 354/64
[58] Field of Search ............................ 354/64

[56] References Cited

U.S. PATENT DOCUMENTS 4,771,299 9/1988 Gell, Jr. ...................... 354/64

FOREIGN PATENT DOCUMENTS 59-168742 11/1984 Japan .
59-41706 12/1984 Japan .
60-169628 11/1985 Japan .
62-40003 8/1987 Japan .

Primary Examiner—Michael L. Gellner
Attorney, Agent, or Firm—Willian Brinks Olds Hofer Gilson & Lione

[57] ABSTRACT

An internal pressure adjusting mechanism for equalizing the internal and external pressures of a waterproof product, such as an underwater camera, when the internal pressure of the product varies due to a change in temperature or atmospheric pressure. The internal pressure adjusting mechanism includes an air circulation passage in the product for establishing communication between the interior of the product and an external atmosphere, and a water-repellent porous member in the passage to permit air to freely circulate through the passage while preventing water from passing therethrough.

8 Claims, 1 Drawing Sheet

INTERNAL PRESSURE ADJUSTING MECHANISM FOR UNDERWATER AND WATERPROOF PRODUCTS

BACKROUND OF THE INVENTION

1. Field of the Invention

The present invention relates generally to a pressure adjusting mechanism; and, more particularly, to an internal pressure adjusting mechanism for equalizing the internal and external pressures of an underwater and waterproof product when the internal pressure of the product varies due to a change in temperature or atmospheric pressure.

2. Description of the Prior Art

In an underwater and waterproof product (e.g., an underwater camera), the external structure of the product is generally designed to be airtight so as to protect the internal mechanism of the product against the entrance of water thereinto.

When the interior of the product is kept airtight, however, a phenomenon arises that a difference in air pressure between the interior of the product and the external atmosphere takes place. For example, there are two cases in which the internal pressure of the product becomes lower than the external pressure. In one case, the opening and closing member of the product is opened and then closed at a time and place in which atmospheric pressure is low, and the product is thereafter used as is at a time and place in which the atmospheric pressure is high. In the second case, the opening and closing member of the product is opened and then closed at a time and place in which the atmospheric temperature is high and the product is thereafter used as is at a time and place in which the atmospheric temperature is low.

In the latter case, the internal pressure varies according to the Boyle-Charles' law. For example, where the atmospheric temperature varies from 70° C. to 20° C., the internal pressure P of the product will be:

$$P = (273+20)/(273+70) = 0.85 \text{ mb}.$$

Further, in the case of an underwater and waterproof product, such as a camera or the like, having means for adjusting the internal pressure of the product in a direction in which the pressure is reduced, the internal pressure drops repeatedly every time the atmospheric pressure and temperature vary.

There are also two cases in which the internal pressure of the product becomes higher than the external pressure. In one such case, the opening and closing member of the product is opened and then closed at a time and place in which the atmospheric pressure is high and the product is thereafter used as is at a time and place in which the atmospheric pressure is low. In the second case, the opening and closing member of the product is opened and then closed at a time and place in which the atmospheric temperature is low and the product is thereafter used as is at a time and place in which the atmospheric temperature is high.

When the internal pressure of the product is low and becomes less than the external pressure, an inwardly directed pressure [(External pressure−Internal pressure)×Area of Opening and Closing member] is applied on the opening and closing member. Especially when the opening and closing member is relatively large, for example, the rear cover of a camera, the inwardly directed pressure adversely affects the opening and closing of the opening and closing member.

For example, when the external pressure is 1.0 mb, the internal pressure is 0.85 mb and the area of the opening and closing member is 7 cm×13 cm=91 cm², a pressure of (1.0−0.85)×91=13.65 Kg is applied against the opening and closing member from the outside.

When the internal pressure of the product becomes too high, the armoring member of the product is susceptible to being deformed due to its inability to withstand the pressure. To prevent deformation of the armoring member, an internal pressure reducing valve (a one-way valve for discharging air from the product) has been provided to prevent the difference between the internal and external pressure from becoming greater than a predetermined level. The provision of such a valve, however, has sometimes made the internal pressure lower than the external pressure such that the operations of opening and closing the opening and closing member such as the rear cover of a camera becomes difficult as described above due to the external pressure applied against the member from outside. Likewise, when a simple mechanical valve is attached to the product so as to compensate for the lowering of the internal pressure to a level below that of the external pressure by admitting air into the product from the outside, water also enters the product so that the waterproof properties of the product is spoiled. There is no underwater and waterproof product available that includes an internal pressure adjusting valve capable of supplying only the open air into the product so as to increase the internal pressure of the product without also allowing water to enter into the product.

SUMMARY OF THE INVENTION

The present invention provides an internal pressure adjusting means for an underwater and waterproof product which is capable of equalizing the internal and external pressures on the product without damaging the waterproof properties of the product.

According to the present invention, there is provided an internal pressure adjusting mechanism for an underwater and waterproof product, such as an underwater camera, which includes an air circulation passage for establishing communication between the interior and the exterior of the product, and a water-repellent porous member positioned within the air circulation passage so as to permit air to circulate through the passage while preventing the entry of water into the product.

According to a presently preferred embodiment, the water-repellent porous member comprises a disk-shaped member formed of one of various new products called porous materials which have the property of repelling water (preventing water from passing therethrough) while permitting air to circulate therethrough. These porous materials are each available in the form of sheet, plate and the like; and, in the following, three examples of concrete structures of the materials are given.

a. A water-repellent material, such as polytetrafluoroethylene (PTFE) and the like, having innumerable fine pores formed of fine knots and fibrils—a material sold under the registered trademark "GORE-TEX" by JAPAN GORE-TEX INC., Japan, for instance. The fine pores permit the passage of air but not of water. If necessary, the material can be coated or laminated on some other material that also permits the passage of air.

b. A material comprising a base cloth and a porous film having innumerable fine pores. The base cloth is laminated with the porous film. The porous film is made of a water-repellent material, such as fluorocarbon resin and the like, and whose pores permit the passage of air but not of water. If necessary, a water-repellent finish is given to the base cloth. As an example, such a material is sold under the registered trademark "MICRO-TEX" by NITTO DENKO CO., LTD., Japan. This material, comprising a cloth and a film, can be glued on some other material with an adhesive, if necessary.

c. A material comprising a base cloth and a film coating a surface of the base cloth. The coating film is made of a water-proof material, such as urethane resin and the like, and has innumerable fine pores to allow the passage of air but not of water. Further, the inside wall of the fine pores are coated with a water-repellent material. A water-repellent finish is further given to the coated base cloth, if necessary. As an example, such a material is sold under the registered trademark "ENTRANT" by TORAY INDUSTRIES, INC., Japan.

A disk-shaped member formed of one of these materials is preferably positioned within the air circulating passage and sealed to the peripheral wall of the passage by a rubber sealing ring or other peripheral sealing member. A thrust plate attached to the outer surface of the product is preferably provided to retain the disk-shaped member and the sealing ring in the passage and to maintain the sealing ring in sealing engagement with the disk-shaped member and the peripheral wall of the passage. Preferably also, a rigid protective member is attached to the outer surface of the product to cover the passage and to protect the porous member against external forces.

The internal pressure adjusting mechanism of the present invention eliminates differences between the interior and external pressures of an underwater and waterproof product such as an underwater camera by using the above-described porous member as an internal pressure adjusting valve so as to allow air to always circulate between the interior and exterior of the product; and, since no water can circulate through the porous member, it prevents the entry of water into the product.

DESCRIPTION OF THE PREFERRED EMBODIMENT

Figure 1:
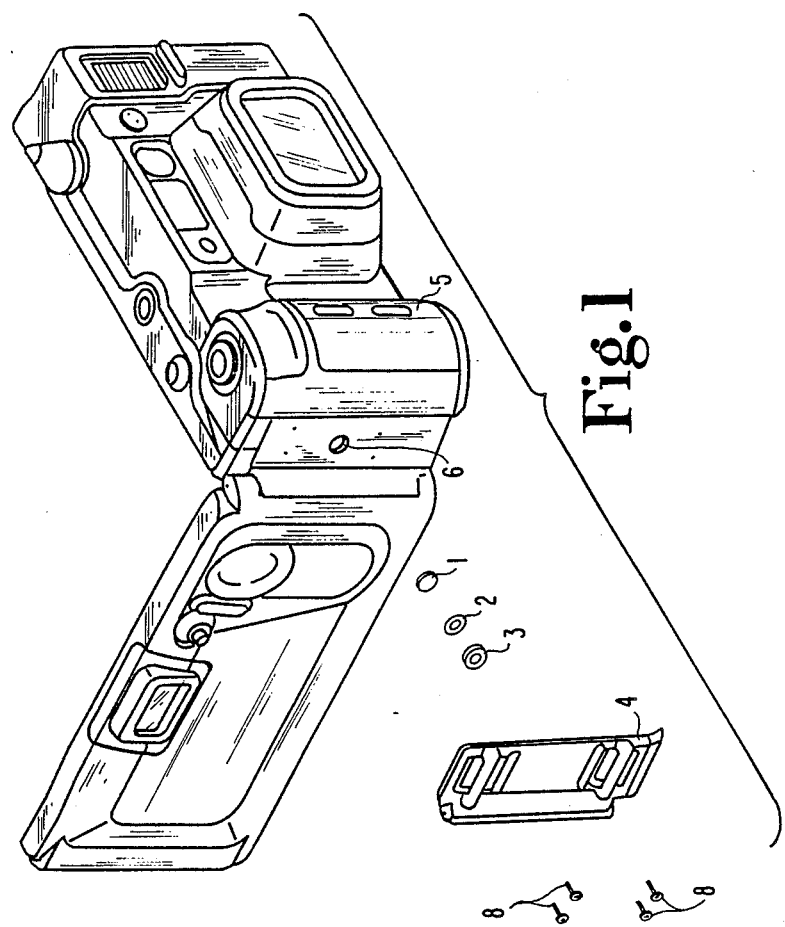
FIG. 1 is a perspective view (partially exploded) of one embodiment of the present invention.
Figure 2:
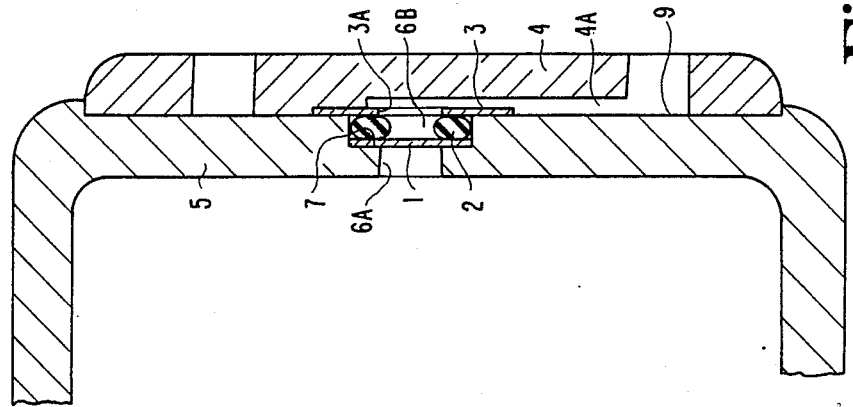
FIG. 2 is a side sectional view of an essential portion of the embodiment of FIG. 1.

FIGS. 1 and 2 illustrate an underwater and waterproof product according to a presently preferred embodiment of the invention. The underwater and waterproof product, which in the preferred embodiment described herein comprises an underwater camera, is designated by reference number 5. A passage or hole 6 is provided in a side surface of the product 5, and, as shown in FIG. 2, extends through the side wall of the product 5 from the outer surface 9 to the interior thereof. As will be explained hereinafter, passage 6 functions as a valve chamber and, as shown in FIG. 2, is stepped to define an inner side valve chamber portion 6A in the form of a small diameter through-hole, and an outer side valve chamber portion 6B in the form of a large diameter through-hole. The inner side valve chamber portion 6A and the outer side valve chamber portion 6B define an outwardly facing annular shoulder 7 therebetween which is positioned substantially centrally within the passage.

A water-repellent porous member 1 is adapted to be positioned within valve chamber 6. As shown in FIG. 2, member 1 comprises a disk-shaped member formed into a suitable size and shape to be received within outer side valve chamber portion 6B and to be supported on outwardly facing shoulder 7. Member 1 is formed from one of several recently developed new products called porous materials which have the property of repelling water, i.e., preventing water from passing therethrough, while permitting air to circulate freely therethrough. These materials are available in the form of a water-repellent sheet or plate having fine pores and include materials sold under the registered trademarks "ENTRANT" (TODAY INDUSTRIES, INC., Japan), "GORE-TEX" (JAPAN GORE-TEX INC., Japan) and "MICRO-TEX"(NITTO DENKO CO., LTD., Japan).

Reference number 2 is a ring of sealing rubber or other suitable material, and is adapted to be positioned on the outer surface of member 1 as shown in FIG. 2. Reference number 3 is a flat pressure plate having a hole 3A in the center thereof. Pressure plate 3 is attached to the outer surface of the underwater and waterproof product 5 such that its center hole 3A is substantially aligned with the central opening of the sealing ring 2. Pressure plate 3 is adapted to engage and press against the sealing ring 2 when it is pushed against the sealing ring 2 as shown in FIG. 2.

Reference number 4 designates an armoring member which is adapted to be screwed onto the outer surface 9 of product 5 by a plurality of screws 8 or the like, as shown in FIG. 1. When the armoring member 4 is attached to product 5, it presses the pressure plate 3 against the sealing ring 2, thereby compressing the sealing ring 2 against disk-shaped member 1 and against the peripheral wall of the passage 6 to firmly and reliably seal the member 1 to the periphery of the passage 6.

The armoring member 4 is provided with an air circulation groove 4A to permit air communication between the valve chamber 6 and the external atmosphere when the armoring member 4 is in place; and, in addition, protects the porous member 1 against external forces by keeping the member 1 out of direct contact with various kinds of external substances.

Thus, according to the present invention, a porous member 1 which allows air but not water to pass therethrough is sealably attached to underwater and waterproof product 5 within valve chamber 6; and an air circulation passage which includes the valve chamber 6 and the air circulation groove 4A is provided through which air circulation is freely permitted and water flow is prevented. Consequently, it is possible to equalize the pressure of the air within the product 5 and the atmospheric pressure while maintaining the waterproof properties of the product such that handling of the product, for example, opening and closing a cover of the product, is facilitated. Further, due to the absence of any complicated mechanism, the structure of the product is quite simple with only a small number of parts thereby contributing to a significant reduction in manufacturing costs.

In order to evidence practical effects of the present invention, the following four tests have been conducted by the inventors, utilizing six underwater cameras as samples of underwater and waterproof products in accordance with the present invention:

TEST 1 Whether or not the rear cover of a camera is smoothly opened on account of the operation of the internal pressure adjusting mechanism, after the camera is left under an atmospheric temperature of $-30°$ C. for five hours, $70°$ C. for five hours and thereafter under a normal temperature for twenty-four hours;

TEST 2 Whether or not water leakage occurs in a camera, after water pressure of 1.0 bar (which is equal to water pressure at a depth of 10 meters) is put on the camera for one hour and water pressure of 0.5 bar (at a depth of 5 meters) is put on the camera for twenty-one hours;

TEST 3 Whether or not water leakage occurs in a camera, when the camera is put into water of normal temperature ($15°$ C.) after being left at a place in which the atmospheric temperature is high ($70°$ C.) for two hours; and TEST 4 The limit of water-pressure-resistance of the camera, i.e., at what degree of water pressure does water leakage occur in the camera. (The water pressure is up to 3.0 bar for convenience of the samples in this test).

In the above tests, "GORE-TEX" is utilized for the water repellent porous member 1. "GORE-TEX" is a tough as well as pliable material made from polytetrafluoroethylene (PTFE), having innumerable fine pores (whose diameters are $0.02\mu$ to $15\mu$). In the tests, three types of "GORE-TEX" are selected, which have pores of a diameter of 0.02, 0.20 and $0.45\mu$, respectively.

Further, two types of O-ring (both manufactured by NOK Co., Ltd., Japan) are used for the sealing ring 2. One is sold under the brand name "1AP-4" and has an inside diameter of 3.8 mm and a diameter of a longitudinal section thereof of 1.9 mm. The other is "1AP-6" which has an inside diameter of 5.8 mm and a diameter of a longitudinal section thereof of 1.9 mm.

The diameter of the through-hole, that is, the inner side valve chamber portion 6A is fixed at either 2.5 mm or 5.0 mm.

The results of the above tests are set forth in the following TABLE.

TABLE

| | Sample | | | Results of Tests | | | |
|---|---|---|---|---|---|---|---|
| No. | Pore Diam. | Valve Diam. | O-Ring | Test 1 | Test 2 | Test 3 | Test 4 water-pressure, time, leakage portion |
| 1 | $0.02\mu$ | 2.5 mm | 1AP-4 | OK | OK | * | 3 bar, 1 min., cover of battery holder |
| 2 | 0.02 | 5.0 | 1AP-6 | OK | OK | * | 3 bar, immediately, viewfinder |
| 3 | 0.20 | 2.5 | 1AP-4 | OK | OK | * | 2.5 bar, 10 min., viewfinder |
| 4 | 0.20 | 5.0 | 1AP-6 | OK | OK | * | 3 bar, 10 min., no leakage |
| 5 | 0.45 | 2.5 | 1AP-4 | OK | OK | * | 2.5 bar, immediately, shutter release |
| 6 | 0.45 | 5.0 | 1AP-6 | OK | OK | * | 2.5 bar, porous member |

In the TABLE, "OK" in Test 1 means the rear cover of the camera smoothly opened, "OK" in Test 2 means water leakage did not occur, and "*" in Test 3 means that a cover glass of the camera fogged up but that water leakages did not occur.

As shown in the TABLE, referring to Sample Nos. 1 to 5, water leakage occurred at various locations on the camera but not at the porous member. Therefore, except for Sample No. 6, the results of the tests are satisfactory. In view of safety measures, Sample No. 1 is the most recommended.

While what has been described constitutes a presently preferred embodiment, it should be recognized that the invention can take numerous other forms. Accordingly, it should be understood that the invention should be limited only insofar as is required by the scope of the following claims.

We claim:

1. An internal pressure adjusting mechanism for an underwater and waterproof product comprising an air circulation passage for establishing communication between the interior of the product and an external atmosphere, and a water-repellent porous member in the passage, said water-repellent porous member permitting air to circulate through the passage while preventing water from passing therethrough.

2. An internal pressure adjusting mechanism according to claim 1, wherein said air circulation passage comprises a first air circulation passage portion in a wall of said product, and wherein said mechanism further includes a rigid protective member having a second air circulation passage portion in communication with said first air circulation passage portion and arranged to cover said porous member for protecting said porous member against external forces.

3. An internal pressure adjusting mechanism according to claim 1, and further including sealing means for sealing said porous member to the periphery of said passage.

4. An internal pressure adjusting mechanism according to claim 3, wherein said air circulation passage defines a valve chamber having a small diameter inner side valve chamber portion and a large diameter outer side valve chamber portion defining an outwardly facing annular shoulder therebetween, said porous member being adapted to be positioned within said large diameter outer side valve chamber portion, and wherein said sealing means comprises a sealing ring positioned on said porous member and a pressure plate for pressing against said sealing ring for sealing said porous member to the periphery of said passage.

5. An internal pressure adjusting mechanism according to claim 4, wherein said mechanism further includes a rigid protective member arranged to force said pressure plate against said sealing ring and to cover said porous member for protecting said porous member against external forces.

6. An internal pressure adjusting mechanism according to claim 1, wherein said underwater and waterproof product comprises an underwater camera.

7. An internal pressure adjusting mechanism for an underwater and waterproof product comprising:
an air circulation passage for establishing communication between the interior of the product and an external atmosphere, said passage including a first passage portion extending through a wall of said product from an outer surface to the interior thereof;
a water-repellent porous member positioned in said first passage portion;
sealing means for sealing said water-repellent porous member to the periphery of said first passage portion; and
a rigid protective member having a second air circulation passage portion for covering said porous member for protecting said porous member against external forces.

8. An internal pressure adjusting mechanism according to claim 7, wherein said first passage portion comprises a stepped passage portion having an outwardly facing, internal annular shoulder against which said porous member is positioned, and wherein said sealing means comprises a sealing ring positioned on said porous member and a pressure plate mounted to said product, said rigid protective member being arranged to force said pressure plate against said sealing ring to seal said porous member to the periphery of said passage.

* * * * *

UNITED STATES PATENT AND TRADEMARK OFFICE
CERTIFICATE OF CORRECTION

PATENT NO. : 4,931,816

DATED : June 5, 1990

INVENTOR(S) : Makoto Kamo and Isamu Nakajima

It is certified that error appears in the above-identified patent and that said Letters Patent is hereby corrected as shown below:

In col. 1, line 6, change "BACKROUND" to --BACKGROUND--.

In col. 4, line 22, change "TODAY" to "TORAY".

Signed and Sealed this

Seventeenth Day of September, 1991

Attest:

HARRY F. MANBECK, JR.

*Attesting Officer*   *Commissioner of Patents and Trademarks*